US006381866B2

(12) United States Patent
Gehrmann et al.

(10) Patent No.: US 6,381,866 B2
(45) Date of Patent: May 7, 2002

(54) CONTINUOUS PROCESS AND APPARATUS FOR THE DRYING AND GEL FORMATION OF SOLVENT-CONTAINING GEL-FORMING POLYMERS

(75) Inventors: Dietrich Gehrmann, Leverkusen; Hartwig Kempkes, Engelskirchen, both of (DE)

(73) Assignee: Bayer Aktiengesellschaft, Leverkusen (DE)

( * ) Notice: Subject to any disclaimer, the term of this patent is extended or adjusted under 35 U.S.C. 154(b) by 0 days.

(21) Appl. No.: 09/755,411

(22) Filed: Jan. 5, 2001

(30) Foreign Application Priority Data

Jan. 14, 2000 (DE) .......................................... 100 01 256

(51) Int. Cl.[7] ............................................... F26B 19/00
(52) U.S. Cl. ......................... 34/62; 34/373; 34/558; 34/362
(58) Field of Search ................... 34/62, 552, 558, 34/362, 370, 372, 373, 394, 428, 429, 496, 516

(56) References Cited

U.S. PATENT DOCUMENTS

| | | | |
|---|---|---|---|
| 2,331,864 A | | 10/1943 | Swinehart et al. .......... 260/232 |
| 4,127,945 A | * | 12/1978 | Nothen et al. ................. 34/62 |
| 4,575,950 A | * | 3/1986 | Miles .......................... 34/516 |
| 5,361,515 A | * | 11/1994 | Peremyschev ................. 34/62 |
| 5,394,622 A | * | 3/1995 | Evans et al. ................. 34/496 |
| 5,647,142 A | * | 7/1997 | Andersen et al. ............. 34/373 |
| 5,849,862 A | * | 12/1998 | Davies et al. ................. 34/372 |
| 5,893,950 A | * | 4/1999 | Martinoni et al. ............ 34/429 |
| 5,981,022 A | * | 11/1999 | Min et al. ..................... 34/428 |
| 6,058,623 A | * | 5/2000 | Brooks et al. ................ 34/362 |
| 6,253,463 B1 | * | 7/2001 | Hansen ......................... 34/362 |
| 6,308,434 B1 | * | 10/2001 | Chickering, III et al. ..... 34/373 |

FOREIGN PATENT DOCUMENTS

| | | |
|---|---|---|
| DE | 952 264 | 11/1956 |
| DE | 196 02 227 | 7/1997 |
| GB | 2262527 | 6/1993 |
| WO | 98/31710 | 6/1998 |

* cited by examiner

Primary Examiner—Joseph Pelham
Assistant Examiner—Fadi H. Dahbour
(74) Attorney, Agent, or Firm—Joseph C. Gil; Aron Preis

(57) ABSTRACT

A continuous process for the drying and gel formation of solvent-containing gel-forming polymers, in particular polysaccharide derivatives, by flash cooling of suspensions of the polymers, and an apparatus for the drying of solvent-containing products are described. The process comprises the steps: metering the solvent-containing polymer having a solids content of 1 to 65% by weight and at a pressure of in particular ambient pressure to 6000 hPa, at a polymer temperature of 20 to 100° C. into an evaporation zone (1), the evaporation zone (1) having a pressure of 0.1 hPa to 800 hPa, cooling the polymer, in particular to a temperature of <93° C., freeing the polymer of 2 to 5% by weight of solvent with mechanical stirring, mixing and conveying of the mixture to the lower end of the evaporation zone (1) with formation of a dense gelled product layer, discharging the polymer by means of a mechanical discharge apparatus (7), optionally with further densification of the polymer, and subsequently drying the gelled polymer in a drying apparatus to a solvent content of not more than 5% by weight.

The apparatus comprises at least one evaporation container (3) having an evaporation zone (1), a stirrer and a conveyor means (8), a product inlet (12), a vapor take-off (5) with connected vacuum generator, and a discharge apparatus (7) connected to the lower end of the evaporation container (3), one or more conveyor paddles (9) having thrust blades (10) which pass across the entrance of the discharge apparatus (7) at a height of not more than 5 mm, in particular 1 to 3 mm, being provided in the lowermost plane of the conveyor means (8).

14 Claims, 2 Drawing Sheets

CONTINUOUS PROCESS AND APPARATUS FOR THE DRYING AND GEL FORMATION OF SOLVENT-CONTAINING GEL-FORMING POLYMERS

The invention relates to a continuous process for the drying and gel formation of solvent-containing gel-forming polymers, in particular polysaccharide derivatives, by flash cooling of suspensions of the polymers and to an apparatus for the drying of solvent-containing products.

The process comprises the steps: metering the solvent-containing polymer having a solids content of 1 to 65% by weight and a pressure of in particular ambient pressure to 6000 hPa, at a polymer temperature of 20 to 100° C., into an evaporation zone, the evaporation zone having a pressure of 0.1 hPa to 800 hPa, cooling the polymer, freeing the polymer of 2 to 5% by weight of solvent with mechanical stirring, mixing and conveying of the mixture to the lower end of the evaporation zone with formation of a dense gelled product layer, discharging the polymer by means of a mechanical discharge apparatus, optionally with further densification of the polymer, and subsequently drying the gelled polymer in a drying apparatus to a solvent content of not more than 5% by weight.

The apparatus described comprises at least an evaporation container having an evaporation zone, a stirrer and a conveyor means, a product inlet, a vapour take-off with connected vacuum generator, a discharge apparatus connected to the lower end of the evaporation container, one or more conveyor paddles having thrust blades which pass across the entrance of the discharge apparatus at a height of not more than 5 mm, preferably 1 to 3 mm, being provided in the lowermost plane of the conveyor means.

German Offenlegungsschrift 196 02 227 A1 discloses a storage container (paste bunker) having a discharge apparatus. In particular, the described stirrer of the storage container has a sleeve design with variable stirring arm geometry for adaptation to the product consistency.

German Patent Specification 952 264 discloses a three-stage process for converting moist, fibrous methylcellulose into powder form of high dissolution rate. Here, the product containing 50 to 70% by weight of water is first homogenized to give a plastic material and is cooled to 10 to 20° C., a cooled screw press being used; the material is then milled using a hammer mill and is dried in a forced-circulation dryer. It is the object of the invention to provide a process and an apparatus which avoid the disadvantages of the known processes and apparatuses and permit comparably safer continuous operation.

Prior gelling of the cellulose ethers is necessary for the drying and for the millability of the cellulose ethers in a miller-dryer.

In particular, it is therefore the object of the invention to develop a drying process which is suitable for solvent-containing gel-forming polysaccharide derivatives, in particular for a cellulose ether suspension, it being necessary to cool the cellulose ether suspension in order to effect gelling and to meter the gel continuously into a downstream apparatus, in particular into a miller-dryer.

In particular, a cellulose ether suspension must be capable of being converted into a homogeneous, gel-like consistency in order to be able to meter the material into a superheated steam miller-dryer.

The object is achieved, according to the invention, if the preheated polymer suspension is introduced into an evaporation zone and the evaporation zone, for example a cylindrical container, is present under a reduced system pressure and the polymer suspension experiences a cooling effect down to below the flocculation point as a result of flashing into the cylindrical container.

The invention relates to a continuous process for the drying and gel formation of solvent-containing gel-forming polymers, in particular polysaccharide derivatives, particularly preferably of hot, aqueous cellulose ether suspensions, by flash cooling (abrupt let-down with cooling) of suspensions of the polymers, comprising the steps: metering the solvent-containing polymer having a solids content of 1 to 65% by weight, preferably of 5 to 50% by weight, particularly preferably of 10 to 40% by weight, at a pressure of in particular ambient pressure to 6000 hPa, at a polymer temperature of 20 to 100° C., preferably of 30 to 95° C., into an evaporation zone, preferably a paste bunker, the evaporation zone having a pressure of 0.1 hPa to 800 hPa, preferably of 20 hPa to 700 hPa, particularly preferably of 40 hPa to 200 hPa, cooling the polymer, in particular to a temperature of <93° C., in particular <60° C., especially of 60° C. to 29° C., freeing the polymer of 2 to 5% by weight of solvent with mechanical stirring, mixing and conveying of the mixture to the lower end of the evaporation zone with formation of a dense gelled product layer, discharging the polymer by means of a mechanical discharge apparatus, in particular with the aid of a single-screw or multiscrew conveyor, optionally with farther densification of the polymer, and subsequently drying the gelled polymer in a drying apparatus to a solvent content of not more than 5% by weight.

The residence time of the polymer in the evaporation zone is preferably from 30 sec to 2 h, particularly preferably from 5 to 30 min.

Preferably, the drying of the gelled polymer is effected at 100 to 500° C., particularly preferably from 100 to 230° C., in a miller-dryer.

Advantageously, the drying of the gelled polymer is carried out in particular at a pressure of about 1000 hPa (i.e. ambient pressure) to 5000 hPa, preferably at 1000 hPa.

Particular advantages are obtained if the drying of the gelled polymer is effected in a superheated steam miller-dryer.

Preferably, the drying of the gelled polymer is effected to a solvent content of not more than 4% by weight.

The polymer particularly preferably to be used in the process is a cellulose ether, in particular methylcellulose.

The solvent used in the process is preferably essentially water.

The invention is distinguished from the prior art in particular that described in German Patent Specification 952 264, in that the cooling of the polymer suspension takes place not by contact cooling of the suspension but by the flash effect, i.e. during the transition from the higher pressure level in the suspension line to the reduced system pressure in the paste bunker (evaporation zone). In contrast to the screw press, this process takes place spontaneously with simultaneous concentration of the polymer suspension. As described in the present patent, the further gelling is achieved by the available residence time in the paste bunker. In contrast to the screw press, the paste bunker additionally has the desirable function of a buffer. The gelling of the polymer (methylcellulose) takes place at a temperature of 10 to 20° C. according to the teaching of German Patent Specification 952 264 but in the present process it takes place at a substantially higher temperature, but typically at <60° C.

The invention furthermore relates to an apparatus for the drying of solvent-containing products, in particular of solvent-containing gel-forming polymers, comprising at least one evaporation container having an evaporation zone, a stirrer and a conveyor means, a product inlet, a vapour take-off with connected vacuum generator, and a discharge apparatus connected to the lower end of the evaporation container, one or more conveyor paddles having thrust blades which pass across the entrance of the discharge apparatus at a height of not more than 5 mm, preferably 1 to 3 mm, being provided in the lowermost plane of the conveyor means.

The discharge apparatus is preferably a single-screw or multiscrew conveyor.

The evaporation container has an additional jacket for passing through a heat-transfer medium in order additionally to promote the devolatilization of the polymer.

In a particularly preferred variant of the apparatus, the thrust blades pass across the entrance of the discharge apparatus at a height of not more than 5 mm, preferably 1 to 3 mm, in order to ensure complete filling of the screw flights. Uniform product conveying and at the same time a tight connection between paste bunker and miller-dryer are thus achieved.

In a preferred embodiment of the apparatus, a throttle means, in particular a throttle valve for maintaining the reduced pressure in the evaporation container, is mounted upstream of the product inlet.

A solid-blade screw conveyor has proved particularly useful as the discharge apparatus.

The apparatus according to the invention is particularly suitable for carrying out the above-described process according to the invention.

Compared with the arrangement disclosed in German Specification 195 02 227 A1, the paste bunker in the apparatus according to the invention has in particular a thrust part, additionally screwed on in each case, on the lower arms, for metering the polymer gel.

The preferred paste bunker shown in FIG. 1 permits gas-tight continuous metering into a downstream drying apparatus. The flash cooling makes use of this advantage in order continuously to flash (to let down) solvent-containing polymers, in particular polysaccharide derivatives, particularly preferably cellulose ether suspensions, having a solids content of 1 to 65% by weight, preferably of 5 to 50% by weight, particularly preferably of 10 to 40% by weight, via an adjustable valve into the cylindrical container under a pressure of 0.1 hPa to 800 hPa, preferably of 20 hPa to 700 hPa, particularly preferably of 40 hPa to 500 hPa.

The flash effect takes place spontaneously when the suspension enters the evaporation zone, if the suspension temperature is above the saturated vapour temperature of the solvent, which temperature forms part of the system pressure. Particularly for cellulose ethers, the system pressure is chosen so that the saturated vapour temperature is <60° C. (below the flocculation point). The vapours formed during the flash effect (flash evaporation) leave the paste bunker via a connection in the lid of the cylindrical container. Preferably, the suspension is concentrated by 2 to 5% and the polymers are cooled to <60° C., in particular 60° C. to 29° C. In order to avoid condensation of the vapours on the cylindrical outer wall, these can preferably be designed to be heatable by means of a double jacket. In order to achieve an additional cooling effect after the flash process, the double jacket can in particular also be cooled, the concentration effect being reduced by the flashing of the solution due to partial condensation.

The paste bunker gives a sufficient residence time, adjustable by means of the height of fill, in order to ensure complete gelling before the gel leaves the paste bunker through the conveyor screw. The poorly meterable product, in particular cellulose ether gel, is fed to the conveyor screw with the aid of a stirrer and the thrust parts mounted in particular in the lowermost stirring plane.

Owing to its design, the paste bunker permits gas tightness with respect to downstream apparatuses, in particular with respect to a drying step by means of superheated steam, so that the state of reduced system pressure in the bunker results in continuous flashing of the hot cellulose ether suspension with simultaneous cooling to the saturated vapour temperature forming part of the system pressure. The system pressure is set so low that the saturated vapour temperature is below the flocculation point of the cellulose ether suspension. At the same time, concentration of the suspension is achieved by the flash effect. On cooling, a homogeneous gel is produced. The residence time for complete gelling can be adjusted in the bunker. The paste bunker simultaneously performs the function of metering the gel into the superheated steam miller-dryer.

The use of a paste bunker having a modified sleeve stirrer is particularly suitable for achieving the technical objects (gentle gel formation) of the invention. The cooling of the hot polymer suspension is achieved by "flashing" into the paste bunker subjected to a vacuum, e.g. at <200 mbar. At the same time, concentration of the cellulose ether suspension and gelling occur. Vapours formed are taken off via the vapour connection in the lid of the paste bunker. Gelling is permitted by a sufficient product residence time, adjustable by means of the level in the paste bunker. The preferably used solid-blade screw meters the gel into the downstream miller-dryer, in particular into a superheated steam miller-dryer.

The design of the stirring arms, in particular of the lower plane, can preferably be adapted to the conveying behaviour of the product and is all the more important for ensuring gas-tight, continuous, uniform metering.

The point for feeding the suspension into the paste bunker is preferably such that feeding is effected mainly tangentially into the paste bunker for good separation of the suspension from the vapours. However, the flashing may also be effected in particular via the lid of the paste bunker. The height of the feed point can be variable. In order to avoid condensation of the vapours, the paste bunker can, as described, be heated by means of a double jacket. In order to assist the cooling effect during flashing of the suspension, the paste bunker may be cooled by means of the double jacket. In this case, the achievable concentration is reduced by condensing vapours.

Inter alia, the following advantages are achieved by the invention:

1. Gentle cooling/drying of suspensions, in particular of solvent-containing gel-forming polysaccharide derivatives, especially a cellulose ether suspension, by the flash effect.

2. Cooling of solvent-containing, gel-forming polysaccharide derivatives, in particular of the cellulose ether suspension, below the flocculation point.

3. Separation of the resulting vapours from the continuously flashed-in suspension.

4. Sufficient residence time for gelling, adjustable by the variable level in the paste bunker.

5. Formation of a homogeneous gel on cooling and gelling.

6. Continuous gas-tight metering from the paste bunker into the downstream drying apparatus, in particular into a superheated steam miller-dryer.

7. Stirrer geometry adaptable to the product consistency in order to ensure constant gas-tight metering.

The invention is further explained below with reference to the figures and by means of the examples, which, however, do not represent any restriction of the invention.

EXAMPLES

General description

Figure 1:
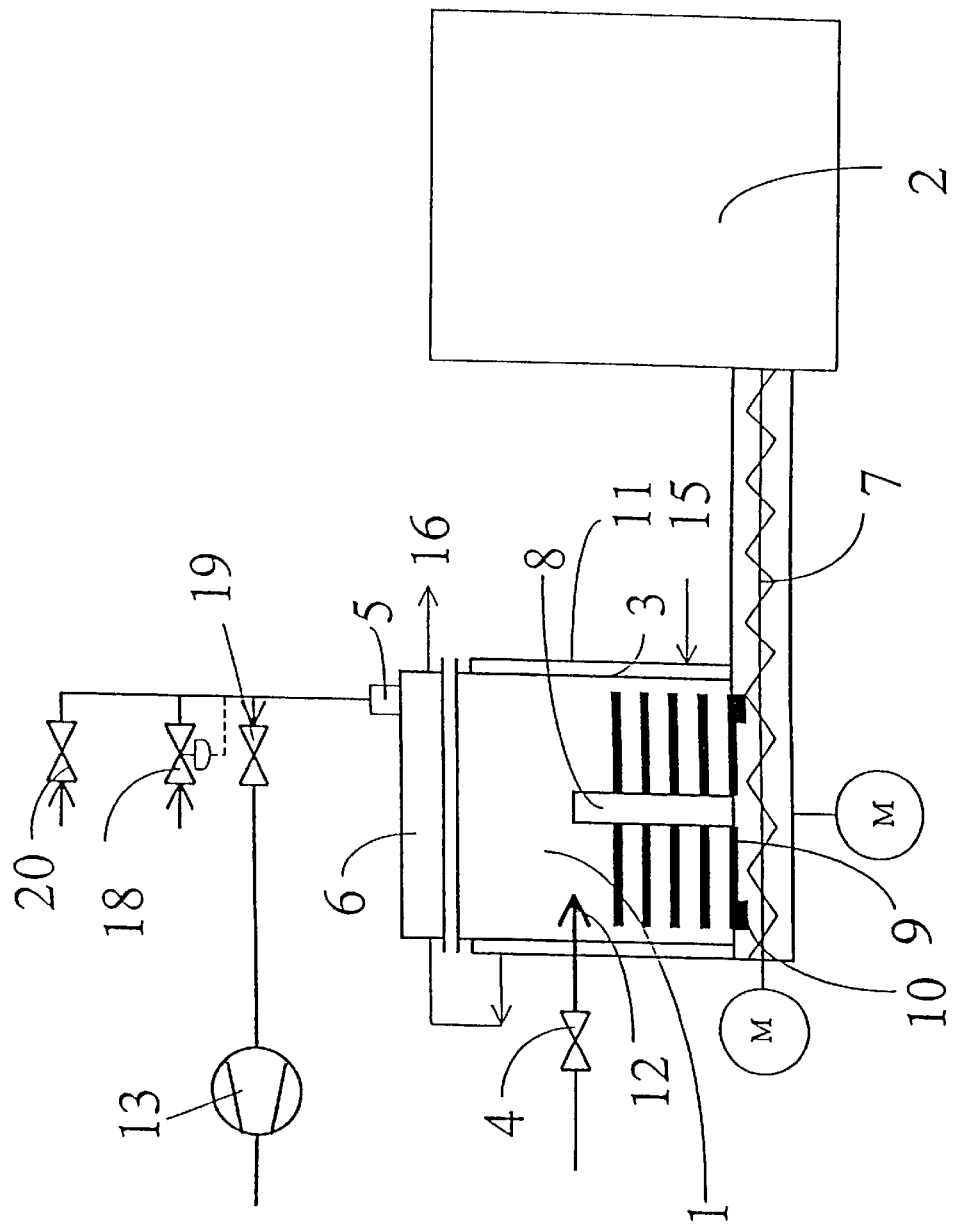
FIG. 1 shows a schematic diagram of the flash introduction of the polymer.
Figure 2:
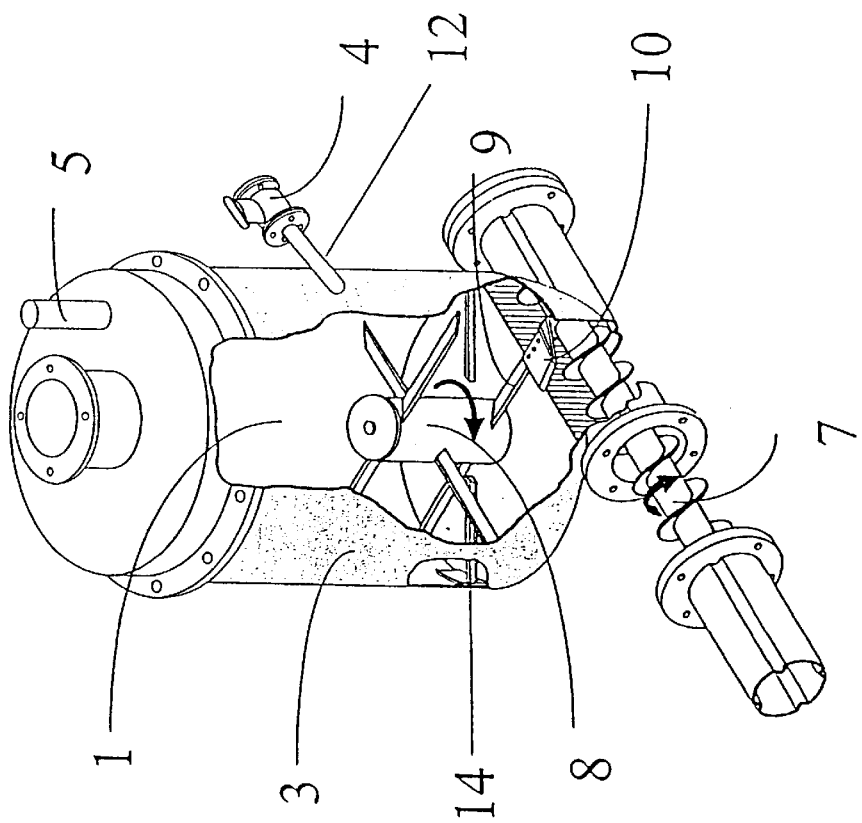
FIG. 2 shows a basic design of the preferably used paste bunker.

A methylcellulose suspension prepared in a moist mixer (not shown) is metered continuously with the aid of a Mohno pump (not shown) into the paste bunker 1 under a reduced system pressure. The level in the paste bunker 1 is kept constant by adaptation of the Mohno pump speed to the gel throughput established by the conveyor screw 7. The conveyor screw 7 of the paste bunker 1 conveys the gel into the superheated steam miller-dryer 2 (Ultra-Rotor II type, manufacturer Jaeckering), where it is dried and milled. The vapours formed on flashing of the methylcellulose suspension are extracted with the aid of a vacuum pump 13 via a valve 19 and the connection 5 in the lid 6 of the paste bunker 1. The system pressure in the paste bunker 1 is set and kept constant by means of a pressure relief valve 18. A vent valve 20 is also mounted on the same feed line. In order to avoid crossing of the vacuum into the suspension line 12 and gelling of the suspension with the danger of blockage of the suspension line 12, a ball valve 4 is installed before the entrance into the cylindrical part of the paste bunker 1. The inlet is arranged tangentially to the housing circumference. The pressure in the suspension line 12 is set by adjusting the ball valve 4 at >100 mbar superatmospheric pressure. An inlet 15 and an outlet 16 for a heating fluid are provided on the paste bunker 1.

Embodiment

The stirrer 8 of the paste bunker 1 is equipped with four stirring planes angled so that they press downwards and three retarders 14 which are fastened in the cylindrical wall 3 and prevent co-rotation of the product with the stirrer 8. The two lowermost stirring arms 9 of the lowermost stirring plane are additionally equipped, in the outer region over a length corresponding to the screw trough width, with a wedge-shaped thrust part 10. These thrust parts 10 are 2 mm away from the bottom and ensure continuous metering of the product to the conveyor screw 7 by the stirrer 8.

A 21% strength by weight methylcellulose suspension (product MT 40000, producer Wolff-Walsrode GmbH) at 82° C. was flashed (metered) continuously into the paste bunker 1 with the aid of a Mohno pump. The system pressure in the paste bunker 1 was 130 mbar. The pressure in the suspension line 12 was set at 3 bar superatmospheric pressure with the aid of the ball valve 4. The double jacket 11 of the paste bunker 1 was not heated and not cooled. The concentration of the methylcellulose suspension increased in the moist mixer to 23.5% by weight by removal of water by evaporation.

Throughputs of moist material in the range from 57 to 165 kg/h of suspension were operated. The residence time in the paste bunker 1 was 14 min at low throughput and 6 min at high throughput. The concentration by the flashing is about 0.054 kg of solvent per kg of suspension. On increasing the throughput, the stirrer speed was increased from 15 to 27 rpm and the conveyor screw speed from 12 to 28 rpm. The conveyor screw 7 conveyed the gel into the miller-dryer 2. By increasing the superheated steam inlet temperature in the miller-dryer 2 from 133 to 181° C. at high throughput, the superheated steam outlet temperature of 120° C. was kept constant. The dried product had a residual moisture content of 2%. The system pressure was 10 mbar superatmospheric pressure on entry of the superheated steam into the miller-dryer 2 and 10 mbar reduced pressure on exit from the dryer 2. The speed of the miller-dryer 2 was set at 1063 rpm.

What is claimed is:

1. Continuous process for the drying and gel formation of solvent-containing gel-forming polymers, comprising polysaccharide derivatives, of hot, aqueous cellulose ether suspensions, by flash cooling of suspensions of the polymers, comprising the steps:

metering the solvent-containing polymer having a solids content of 1 to 65% by weight, or of 5 to 50% by weight, or of 10 to 40% by weight, at a pressure of ambient pressure to 6000 hPa, at a polymer temperature of 20 to 100° C., or of 30 to 95° C., into an evaporation zone (1), comprising a paste bunker, the evaporation zone (1) having a pressure of 0.1 hPa to 800 hPa, or of 20 hPa to 700 hPa, or of 40 hPa to 200 hPa, cooling the polymer, to a temperature of <93° C., or <60° C., or of 60° C. to 29° C., freeing the polymer of 2 to 5% by weight of solvent with mechanical stirring, mixing and conveying of the mixture to the lower end of the evaporation zone (1) with formation of a dense gelled product layer discharging the polymer by means of a mechanical discharge apparatus (7), with the aid of a single-screw or multiscrew conveyor (7), with further densification of the polymer, and subsequently drying the gelled polymer in a drying apparatus to a solvent content of not more than 5% by weight.

2. Process according to claim 1, characterized in that the residence time of the polymer in the evaporation zone (1) is from 30 sec to 2 h, or from 5 to 30 min.

3. Process according to claim 1 or 2, characterized in that the drying of the gelled polymer is effected at 100 to 500° C., or from 100 to 230° C., in a miller-dryer.

4. Process according to any of claims 1 to 3, characterized in that the drying of the gelled polymer is effected at a pressure of 1000 to 5000 hPa, or of 1000 hPa.

5. Process according to any of claims 1 to 4, characterized in that the drying of the gelled polymer is effected in a superheated steam miller-dryer.

6. Process according to any of claims 1 to 5, characterized in that the drying of the gelled polymer is effected to a solvent content of not more than 4% by weight.

7. Process according to any of claims 1 to 5, characterized in that the solvent is essentially water.

8. Process according to any of claims 1 to 5, characterized in that the polymer is a cellulose ether, comprising methylcellulose.

9. Apparatus for the drying of solvent-containing products, comprising solvent-containing gel-forming polymers, comprising at least one evaporation container (3) having an evaporation zone (1), a stirrer and a conveyor means (8), a product inlet (12), a vapour take-off (5) with connected vacuum generator, and a discharge apparatus (7) connected to the lower end of the evaporation container (3), one or more conveyor paddles (9) having thrust blades (10) which pass across the entrance of the discharge apparatus (7) at a height of not more than 5 mm, 1 to 3 mm, being provided in the lowermost plane of the conveyor means (8).

10. Apparatus according to claim 9, characterized in that the discharge apparatus (7) is a single-screw or multiscrew conveyor (7).

11. Apparatus according to claim 10, characterized in that a solid-blade screw conveyor (7) is provided as the discharge apparatus (7).

12. Apparatus according to claim 9 or 10, characterized in that the evaporation container (3) has an additional jacket (11) for passing through a heat-transfer medium.

13. Apparatus according to any of claims 9 to 12, characterized in that the thrust blades (10) pass across the entrance of the discharge apparatus (7) at a height of not more than 2 mm.

14. Apparatus according to any of claims 9 to 13, characterized in that a throttle means (4), comprising a throttle valve (4) for maintaining the reduced pressure in the evaporation container (3), is mounted upstream of the product inlet (12).

* * * * *